INVENTORS
MARVIN GORMAN, MICHAEL E. HANEY, JR.
DAVID H. LIVELY, JAMES D. DAVENPORT
BY

ATTORNEY

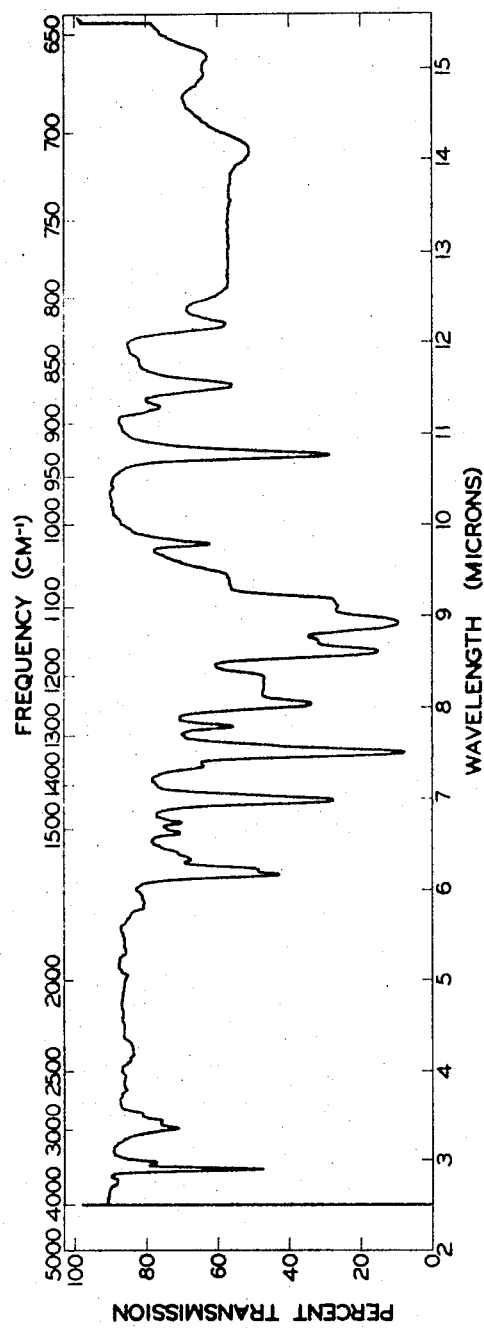

United States Patent Office 3,590,051
Patented June 29, 1971

3,590,051
MODIFIED PYRROLNITRINS
Marvin Gorman, Indianapolis, Michael E. Haney, Jr., West Lafayette, and David H. Lively and James D. Davenport, Indianapolis, Ind., assignors to Eli Lilly and Company, Indianapolis, Ind.
Continuation-in-part of application Ser. No. 533,787, Mar. 14, 1966, now Patent No. 3,476,648. This application July 27, 1967, Ser. No. 656,514
Int. Cl. C07d 27/22
U.S. Cl. 260—326.9      5 Claims

ABSTRACT OF THE DISCLOSURE

Modified derivatives of pyrrolnitrin comprising 4-substituted phenyl-3-chloropyrroles, in which the 4-substituent is a halo-, trifluoromethyl-, or methyl-substituted aminophenyl or nitrophenyl group, and a process for the production thereof by the addition of a tryptophane, substituted in the 5-, 6- or 7-position by halogen, trifluoromethyl, or methyl, to a fermentation medium suitable for the culture of a pyrrolnitrin-producing organism. The compounds are useful as antibacterial and antifungal agents.

CROSS-REFERENCE

Figure 1:
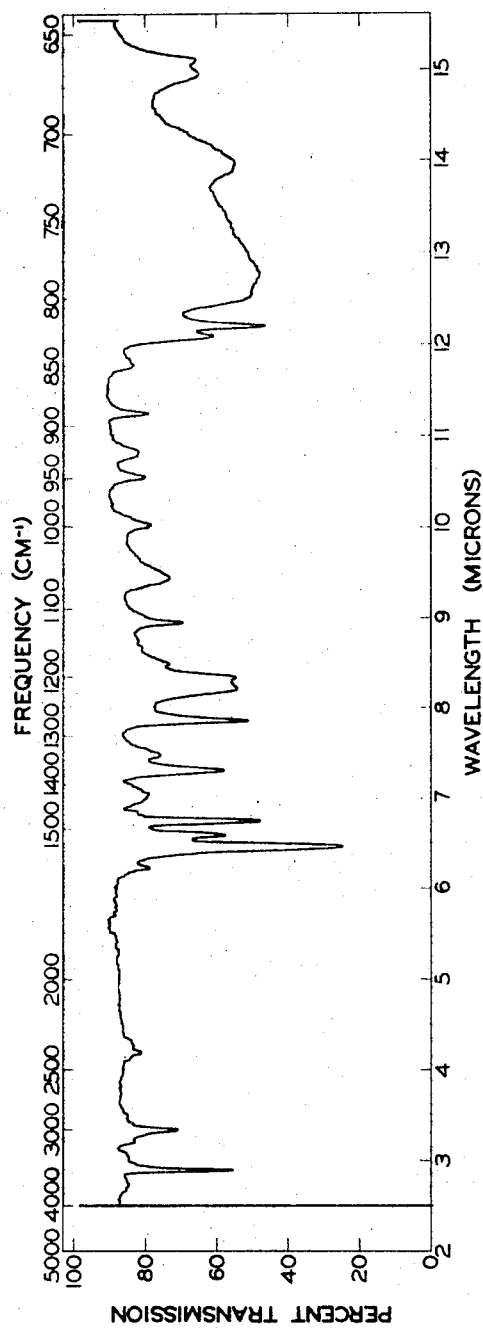

The present invention is a continuation-in-part of our copending application Ser. No. 533,787, filed Mar. 14, 1966, now U.S. Pat. No. 3,476,648.

BACKGROUND OF THE INVENTION

Pyrrolnitrin is an antibacterial and antifungal antibiotic which has been described in the Journal of Antibiotics, Series A, vol. 18, p. 211 (1965) and characterized as 3 - (2'-nitro-3'-chlorophenyl)-4-chloropyrrole. In our copending application Ser. No. 533,787, filed Mar. 14, 1966, we described a process for obtaining enhanced yield of pyrrolnitrin by the addition of the amino acid tryptophane, and particularly the d-isomer thereof, to the fermentation medium in which the antibiotic is produced.

SUMMARY

In accordance with the present invention derivatives of pyrrolnitrin comprising 4-substituted phenyl-3-chloropyrroles, in which the 4-substituent is a halo-, trifluoromethyl-, or methyl-substituted aminophenyl or nitrophenyl group, are produced by fermentation with a pyrrolnitrin-producing organism in a nutrient medium to which has been added a substituted tryptophane of the formula

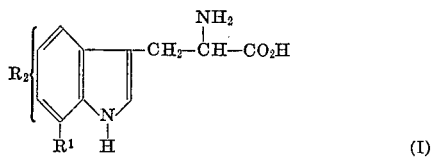

(I)

wherein $R^2$ is a substituent in the 5- or 6-position of tryptophane and $R^1$ and $R^2$ are hydrogen, fluoro, chloro, bromo, methyl or trifluoromethyl, at least one of $R^1$ and $R^2$ being a group other than hydrogen. The pyrrolnitrin derivative so produced has the formula

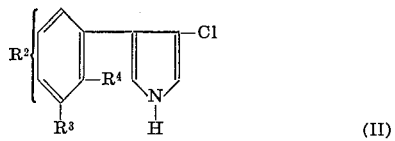

(II)

wherein $R^2$ is hydrogen, fluoro, chloro, bromo, methyl or trifluoromethyl in the 4- or 5-position of the benzene ring; $R^3$ is hydrogen or chloro when $R^1$ in the substituted tryptophane above is hydrogen and is the same as $R^1$ when $R^1$ is a group other than hydrogen; and $R^4$ is nitro- or amino.

Illustrative of the compounds which can be prepared by the process of the present invention are the following:

3-chloro-4-(2'-nitro-3'-fluorophenyl)pyrrole,
3-chloro-4-(2'-nitro-3'-bromophenyl)pyrrole,
3-chloro-4-(2'-nitro-3'-methylphenyl)pyrrole,
3-chloro-4-(2'-nitro-3'-trifluoromethylphenyl)pyrrole,
3-chloro-4-(2'-amino-3'-fluorophenyl)pyrrole,
3-chloro-4-(2'-amino-3'-bromophenyl)pyrrole,
3-chloro-4-(2'-amino-3'-methylphenyl)pyrrole,
3-chloro-4-(2'-amino-3'-trifluoromethylphenyl)pyrrole,
3-chloro-4-(2'-nitro-3'-chloro-4'-fluorophenyl)pyrrole,
3-chloro-4-(2'-nitro-3'-chloro-4'-chlorophenyl)pyrrole,
3-chloro-4-(2'-nitro-3'-chloro-4'-bromophenyl)pyrrole,
3-chloro-4-(2'-nitro-3'-chloro-4'-methylphenyl)pyrrole,
3-chloro-4-(2'-nitro-3'-chloro-4'-trifluoromethylphenyl) pyrrole,
3chloro-4-(2'-amino-3'-chloro-4'-fluorophenyl)pyrrole,
3-chloro-4-(2'-amino-3'-chloro-4'-chlorophenyl)pyrrole,
3-chloro-4-(2'-amino-3'-chloro-4'-bromophenyl)pyrrole,
3-chloro-4--(2'-amino-3'-chloro-4'-methylphenyl)pyrrole,
3-chloro-4-(2'-amino-3'-chloro-4'-trifluoromethylphenyl) pyrrole,
3-chloro-4-(2'-nitro-3'-chloro-5'-fluorophenyl)pyrrole,
3-chloro-4-(2'-nitro-3'-chloro-5'-chlorophenyl)pyrrole,
3-chloro-4-(2'-nitro-3'-chloro-5'-bromophenyl)pyrrole,
3-chloro-4-(2'-nitro-3'-chloro-5'-methylphenyl)pyrrole,
3-chloro-4-(2'-nitro-3'-chloro-5'-trifluoromethylphenyl) pyrrole,
3-chloro-4-(2'-amino-3'-chloro-5'-fluorophenyl)pyrrole,
3-chloro-4-(2'-amino-3'-chloro-5'-chlorophenyl)pyrrole,
3-chloro-4-(2'-amino-3'-chloro-5'-bromophenyl)pyrrole,
3-chloro-4-(2'-amino-3'-chloro-5'-methylphenyl)pyrrole,
3-chloro-4-(2'-amino-3'-chloro-5'-trifluoromethylphenyl) pyrrole,
3-chloro-4-(2'-nitro-4'-fluorophenyl)pyrrole,
3-chloro-4-(2'-nitro-4'-chlorophenyl)pyrrole,
3-chloro-4-(2'-nitro-4'-bromophenyl)pyrrole,
3-chloro-4-(2'-nitro-4'-methylphenyl)pyrrole,
3-chloro-4-(2'-nitro-4'-trifluoromethylphenyl)pyrrole,
3-chloro-4-(2'-amino-4'-fluorophenyl)pyrrole,
3-chloro-4-(2'-amino-4'-chlorophenyl)pyrrole,
3-chloro-4-(2'-amino-4'-bromophenyl)pyrrole,
3-chloro-4-(2'-amino-4'-methylphenyl)pyrrole,
3-chloro-4-(2'-amino-4'-trifluoromethylphenyl)pyrrole,
3-chloro-4-(2'-nitro-5'-fluorophenyl)pyrrole,
3-chloro-4-(2'-nitro-5'-chlorophenyl)pyrrole,
3-chloro-4-(2'-nitro-5'-bromophenyl)pyrrole,
3-chloro-4-(2'-nitro-5'-methylphenyl)pyrrole,
3-chloro-4-(2'-nitro-5'-trifluoromethylphenyl)pyrrole,
3-chloro-4-(2'-amino-5'-fluorophenyl)pyrrole,
3-chloro-4-(2'-amino-5'-chlorophenyl)pyrrole,
3-chloro-4-(2'-amino-5'-bromophenyl)pyrrole,
3-chloro-4-(2'-amino-5'-methylphenyl)pyrrole,
3-chloro-4-(2'-amino-5'-trifluoromethylphenyl)pyrrole,
3-chloro-4-(2'-nitro-3',4'-dichlorophenyl)pyrrole,
3-chloro-4-(2'-nitro-3',4'-difluorophenyl)pyrrole,
3-chloro-4-(2'-nitro-3',4'-dimethylphenyl)pyrrole,
3-chloro-4-(2'-nitro-3'-fluoro-4'-chlorophenyl)pyrrole,
3-chloro-4-(2'-nitro-3'-methyl-4'-chlorophenyl)pyrrole.

The novel products obtainable by the process of the present invention represent a further feature thereof. Among such products, those containing a trifluoromethyl substituent represent a preferred group, as do those in which the substituent in the 2-position of the phenyl group is amino.

The modified pyrrolnitrins made available by the present invention have an inhibitory action against a broad spectrum of bacterial and fungal organisms and are, therefore, useful in suppressing the growth of such organisms. They are especially useful in the form of disinfectant solutions, pastes and creams.

DESCRIPTION OF THE PREFERRED EMBODIMENTS

The practice of the present invention requires virtually no departure from the fermentation process usually employed for the production of pyrrolnitrin. Thus, for example, the media employed at all stages of the fermentation process can be identical to those employed in the procedure of pyrrolnitrin except for the addition of a suitably substituted tryptophane derivative to the final production medium. Suspensions of a pyrrolnitrin-producing organism such as, for example, Pseudomonas spp. ATCC 15925 or ATCC 15926 are produced from agar slants as is customary in the art. The suspensions are then employed to produce an intermediate vegetative culture and the vegetative culture so obtained is used to inoculate the fermentation medium used for the production of the modified antibiotic. For the production of one of the substituted pyrrolnitrin derivatives of the present invention, the final production medium is enriched by the addition of a suitably substituted tryptophane derivative. Generally speaking, the final fermentation mixture resulting from the present invention will contain some pyrrolnitrin in addition to one or more modified pyrrolnitrin derivatives. Frequently, a reduced form of the modified pyrrolnitrin in which the position normally occupied by the nitro group is occupied by an amino group, is produced in addition to, or instead of, the usual nitro-containing compound. Such amino analogues can be converted to the corresponding nitro compounds by microbiological oxidation techniques. Thus, for example, addition of the amino analogue to a fresh fermentation medium containing a pyrrolnitrin-producing organism results in the production of the corresponding nitro derivative. Any of the nitro derivatives can, of course, be converted to the analogous amino compounds by catalytic or chemical reduction methods. Modified pyrrolnitrin derivatives in which the chloro substituent adjacent to the nitro group is absent are also produced in the fermentation. Separation and isolation of the components of the mixture are most conveniently accomplished by employing chromatographic techniques known in the art. Maximum yields of antibiotic activity are generally obtained after five to ten days of fermentation.

The concentration of the substituted tryptophane derivative which is employed can vary within rather wide limits. Generally speaking, however, concentrations between about 50 and 2000 mcg./ml. of the substituted tryptophane are preferred. Optimum levels of the substituted tryptophane leading to the best yields of the substituted pyrrolnitrin are between about 100 and 500 mcg./ml. Generally speaking, concentration in the upper half of the preferred range lead to the highest ratio of modified pyrrolnitrin to pyrrolnitrin in the fermentation product.

The time at which the substituted tryptophane is incorporated into the fermentation medium can also be varied within rather wide limits. Thus, in general, the yield of total antibiotic activity obtained when the substituted tryptophane is added at the beginning of the fermentation are approximately equivalent to the yields resulting when the addition is made up to about 72 hours after the initiation of the fermentation. Even later addition of the substituted tryptophane is possible but may result in a higher proportion of the unmodified pyrrolnitrin being produced. Generally speaking, addition of the substituted tryptophane 24 hours after the initiation of the fermentation is preferred for maximum yields of the modified pyrrolnitrin.

The production of modified derivatives of pyrrolnitrin occurs in a wide variety of fermentation media. In general, those media giving the best yields of pyrrolnitrin without tryptophane supplementation also give higher yields of the modified pyrrolnitrin when a substituted tryptophane is employed.

The addition of the substituted tryptophane appears to be equally effective in producing modified pyrrolnitrin derivatives whether the fermentation is carried out in shake flasks or in stirred equipment. Moreover, the overall nature of the fermentation products produced during the fermentation does not appear to be greatly influenced by the nature of the equipment employed. This is evidenced by the fact that the thin layer chromatograms or bioautographs of the fermentation broths obtained from both types of equipment are substantially the same.

It will be obvious to those skilled in the art that, while the present invention has been described with special reference to the preparation of pyrrolnitrin analogues by a fermentation process using Pseudomonas spp. ATCC 15925 or ATCC 15926, any pyrrolnitrin-producing species of Pseudomonas which utilizes exogenous tryptophanes in its metabolism can be employed and is to be considered to be within the spirit of the invention.

The substituted tryptophanes employed in the present invention are either known in the art or can be prepared readily by employing art-recognized procedures. Thus, for example, one method of obtaining a desired substituted tryptophane employs the correspondingly substituted indole as a starting material. The indole is caused to undergo a typical Mannich reaction with formaldehyde and diethylamine and the resulting substituted 3-diethylaminoindole is then condensed with diethyl formamidomalonate according to the general procedure of Rydon et al., J. Chem. Soc., 1955, 3499, to form the corresponding 3-indolylmethylformamidomalonic ester. Hydrolysis and decarboxylation of the foregoing intermediate produces the desired substituted tryptophane.

An alternative method for the preparation of the substituted tryptophanes employs an appropriately substituted phenylhydrazine, rather than the corresponding indole, as the starting material. The phenylhydrazine is condensed with the adduct of acrolein and acetamidomalonic ester described by Moe et al., J. Am. Chem. Soc., 70, 2763 (1948), to prepare the substituted phenylhydrazone which is then cyclized to produce the substituted 3-indolylmethylacetamidomalonic ester according to the general procedure of Warner et al., J. Am. Chem. Soc., 70, 2767 (1948). Hydrolysis and decarboxylation affords the desired substituted tryptophane.

Suitably substituted indoles and phenylhydrazines which serve as intermediates in the foregoing syntheses are likewise prepared by methods known in the art. The indoles can be prepared either from the appropriately substituted o-nitrotoluenes, by the method of Rydon et al., J. Chem. Soc., 1955, 3499, or by cyclization of suitably substituted phenylhydrazines. The latter can be prepared by the general procedure of Bullock et al., J. Am. Chem. Soc., 78, 5854 (1956).

The invention is further illustrated by the following nonlimiting examples:

EXAMPLE 1

A culture of Pseudomonas spp. ATCC 15926 is produced by growing the organism on an agar slant having the following composition:

Agar slant medium

| | G. |
|---|---|
| Trypticase soy broth | 30 |
| Agar | 15 |

Deionized water, added to make a final volume of 1 liter.

The medium is sterilized at 121° C. for 20 minutes in an autoclave. The pH of the medium after sterilization is between about pH 7 and about pH 7.2. The slant is inoculated with cells of Pseudomonas spp. ATCC 15926 and is incubated at about 30° C. for about 48 hours. A loop of the resulting culture is used to inoculate 60 ml. of a vegetative medium contained in a 250-ml. Erylenmeyer flask. The vegetative medium has the following composition:

Vegetative medium

| | G. |
|---|---|
| Beef extract | 1.5 |
| Yeast extract | 6 |
| Peptone | 6 |
| Casitone [1] | 4 |
| Cerelose | 10 |
| Deionized water, added to make a final volume of 1 liter. | |

[1] Pancreatic digest of casein, sold by Difco Laboratories, Detroit, Mich.

The pH of the vegetative medium after sterilization at 121° C. for 20 minutes is between about pH 6.8 and about pH 7. The inoculated medium is incubated at about 30° C. on a rotary shaker having an agitation rate of 250 r.p.m. and a 2-inch throw for about 6 hours, or until the light transmission of the culture is about 50 percent at a wave length of 525 m$\mu$. The vegetative culture is used as an inoculum for a production medium having the following composition:

Corn steep-molasses-malt medium

Sucrose—25 g.
Molasses (Brer Rabbit)—25 ml.
Corn steep (50% solids)—5 ml.
Malt extract—10 g.
Potassium hydrogen phosphate—2 g.
NZ case peptone [1]—10 g.
Tap water, added to make a final volume of 1 liter.

[1] Pancreatic digest of casein for microbiological use, sold by Sheffield Chemicals, Norwich, N.Y.

The foregoing medium is sterilized in 121° C. for 25 minutes and has a final pH after sterilization of about pH 6.2 to about pH 6.4. A number of flasks containing the medium are each inoculated with 0.1 percent (volume/volume) of the vegetative culture obtained as described above and are incubated at about 30° C. on a rotary shaker having a 2-inch throw operating at 250 r.p.m. Various amounts of 6-fluorotryptophane are added to some of the flasks at 24 hours after inoculation. The same levels of the amino acid are added to other flasks 48 hours after inoculation. One group of flasks is maintained without the addition of amino acid to serve as controls. Samples of the culture broth are withdrawn from each of the flasks 120 hours and 144 hours after the fermentation has been initiated. The culture broth samples are diluted with two volumes of methanol and filtered to remove solids. The antibiotic mixture comprising pyrrolnitrin and fluoropyrrolnitrin is found in the filtered fermentation broths. The amount of antibiotic activity present is determined by an agar diffusion paper disk assay using a species of Neurospora as the test organism. The results are shown in Table I.

TABLE I

| | 6-fluorotryptophane added, mcg./ml. of medium | Antibiotic activity [1] after indicated incubation time, mcg./ml. | |
|---|---|---|---|
| | | 120 hrs. | 144 hrs. |
| Time of addition, hrs.: | | | |
| 24 | 500 | 75 | 88 |
| | 1,000 | 68 | 70 |
| | 2,000 | 40 | 45 |
| 48 | 500 | 64 | 70 |
| | 1,000 | 69 | 72 |
| | 2,000 | 60 | 70 |
| Control | 0 | 50 | 50 |

[1] All values are averages of duplicate flasks.

The presence of a modified pyrrolnitrin was demonstrated by employing an extraction procedure followed by thin layer chromatography of a sample of the material obtained by extraction. Two volumes of methanol were added to one volume of culture broth obtained as described above, and the diluted culture broth was stirred with 3 percent by weight of Hyflo Super Cel. After filtration the filtrate was concentrated to remove methanol, and the pH was adjusted to about pH 10.5 with sodium hydroxide. The resulting mixture was extracted with about two-thirds volume of toluene and the organic phase was concentrated to a small volume. A sample of the concentrate was spotted on a Silica G thin layer plate. The same plate was also spotted with a solution containing authentic pyrrolnitrin and with a sample obtained from a fermentation to which 6-fluorotryptophane had not been added. The plate was developed in a benzene chamber, and the spots were made visible by spraying with sulfuric acid after drying. The developed plate clearly showed the presence of a pyrrolnitrin-like spot representing a material having an $R_f$ value slightly greater than that of pyrrolnitrin.

EXAMPLE 2

Separation of 3 - chloro-4-(2'-nitro-3'-chloro-4'-fluorophenyl)pyrrole, hereinafter called fluoropyrrolnitrin, from the antibiotic mixture obtained according to the procedure of Example 1 was accomplished as follows: Nine hundred ml. of crude culture broth, obtained as in Example 1, were diluted with 1800 ml. of methanol, stirred for about one-half hour, mixed with a filter aid and filtered. The filtrate was concentrated in vacuo to remove methanol, and the pH was adjusted to about pH 10.5 by the addition of 5 N sodium hydroxide. The resulting basic mixture was twice extracted with an equal volume of toluene. The toluene extracts were concentrated to dryness in vacuo, and the residue was dissolved in a small amount of benzene. The benzene solution was applied to a 1.7 x 95 cm. chromatographic column packed with Silica Gel Woelm, a chromatography grade Silica Gel manufactured by M. Woelm, Eschwege, Germany. After all the material had been applied to the column, the column was eluted with benzene. The progress of the elution of the antibiotic activity was followed by thin layer chromatography as described in Example 1. The active fractions were combined, concentrated to dryness, and dissolved in 1 ml. of benzene. Crystallization was accomplished by adding 9 ml. of n-hexane to the benzene solution slowly and chilling at about 5° C. overnight. The crystallized material was separated by centrifugation, washed with n-hexane and dried in vacuo. Material so obtained melted at 145–149° C. Thin layer chromatography on Silica Gel G with multiple development in a solvent mixture comprising three parts benzene to seven parts Skellysolve F demonstrated the presence of a minor factor corresponding to pyrrolnitrin, with an $R_f$ value of 0.313, and a major factor with an $R_f$ value of 0.368.

The aqueous phase remaining after the toluene extraction was concentrated in vacuo to remove toluene, the pH was readjusted to about pH 10.5 and the mixture was extracted twice with chloroform. The combined chloroform extracts were concentrated to dryness and the residue was dissolved in benzene. The benzene solution was passed over a chromatographic column as described above. The active fractions were combined and concentrated to dryness and the residue was dissolved in 1 ml. of chloroform. Crystallization was effected as above by the slow addition of 9 ml. of n-hexane followed by chilling overnight at about 5° C. The resulting crystals were separated, washed with n-hexane and dried in vacuo and comprised single component fluoropyrrolnitrin having an $R_f$ value of 0.368 and melting at about 155° C. The molecular ions, as determined by mass spectrometry, were 274 and 276, the expected values for the desired product. The infrared absorption spectrum of a chloroform solution of the product, shown in FIG. 1, has the following significant bands in the region of about 2 to about 15 microns: 2.89; 3.32, 6.22, 6.47, 6.64, 6.74, 7.30, 7.47, 7.85, 8.47, 8.93, 9.42, 10.00, 10.53, 10.80, 11.24, 11.76, 12.08, 12.20, 13.95, 14.95, and 15.10. The ultraviolet absorption spectrum exhibits maxima at 209 and 248 m$\mu$ with $a_M$ values of 24,000 and 6.580, respectively. Nuclear magnetic resonance spectral data indicate the presence of three pyrrole protons, one being attached to the pyrrole nitrogen, and two benzene protons, thus confirming the presence of an additional substituent on the benzene ring.

EXAMPLE 3

Figure 2:
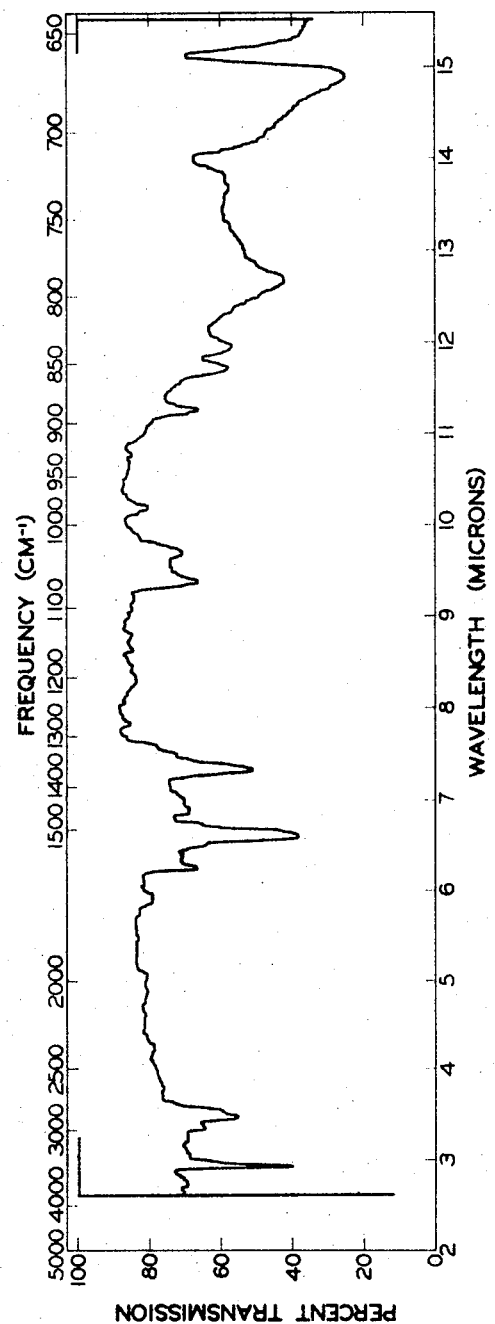

By employing 7-methyltryptophane instead of 6-fluorotryptophane in the fermentation procedure of Example 1 and subjecting the crude culture broth so obtained to the separation and purification procedures described in Example 2, 3-chloro-4-(2'-nitro-3'-methylphenyl)pyrrole is obtained. The significant bands in the infrared absorption spectrum of the product, shown in FIG. 2, are as follows: 2.91, 3.34, 3.47, 3.55, 6.23, 6.57, 6.72 (shoulder), 6.87, 7.0, 7.32, 7.48, 7.57, 7.82, 8.62, 8.79, 9.37, 9.69, 10.18, 10.76, 11.25, 11.71 and 11.95 microns. The ultraviolet absorption spectrum exhibits maxima at 205 and 245 m$\mu$, and the molecular ions, as determined by mass spectrometry are 236 and 238.

EXAMPLE 4

By substituting 6-trifluoromethyltryptophane in place of 6-fluorotryptophane in the fermentation procedure of Example 1 and following the separation procedure described in Example 2, 3-chloro-4-(2'-amino-4'-trifluoromethylphenyl)-pyrrole is obtained. The molecular ions as determined by mass spectrometry are 260 and 262. The significant bands in the infrared absorption spectrum of the product, shown in FIG. 3, are as follows: 2.90, 2.97, 3.35, 3.43, 3.51, 6.17, 6.22 (shoulder), 6.33, 6.63, 6.74, 6.98, 7.35, 7.50, 7.80, 8.03, 8.60, 8.92, 9.1, 9.78, 9.9, 10.76, 11.29, 11.53 and 12.19 microns. The ultraviolet absorption spectrum of the product in ethanol solution at neutral pH exhibits maxima at 219, 262 and 310 m$\mu$ with $a_m$ values of 21,700, 6,450 and 5,430, respectively; the observed maxima at acidic pH values are 247 and 280 m$\mu$ with $a_m$ values of 7,910 and 7,460, respectively

EXAMPLE 5

A procedure suitable for the conversion of pyrrolnitrin or substituted derivatives thereof to the corresponding amino analogues is illustrated by the following procedure for the chemical reduction of pyrrolnitrin.

A solution of 120 mg. of pyrrolnitrin in 5 ml. of methanol is treated with 5 ml. of 5 N sodium hydroxide. The resulting dark yellow solution is heated to reflux and 300 mg. of sodium hydrosulfite are added. The mixture is heated at reflux for 30 minutes after which an additional 5 ml. of 5 N sodium hydroxide and 300 mg. of sodium hydrosulfite are added. The additions are repeated at 30-minute intervals until the reduction appears to be complete. The course of the reduction is followed by thin-layer chromatography on silica with ultraviolet light detection of the spots. About 30 minutes after the final addition of the reducing agent, 25 ml. of water are added and the methanol is removed under vacuum. The remaining reaction product mixture is extracted three times with 20-ml. portions of benzene and the combined benzene extracts are dried and evaporated to dryness. After crystallization from a solvent mixture of ether and hexane, 80 mg. of reduced pyrrolnitrin melting at about 90–92° C. are obtained.

We claim:
1. A compound of the formula

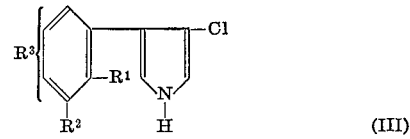

(III)

wherein $R^1$ is nitro or amino, $R^2$ is hydrogen, fluoro, chloro, bromo, methyl, or trifluoromethyl, and $R^3$ is hydrogen, fluoro, chloro, bromo, methyl, or trifluoromethyl when $R^1$ is amino and is trifluoromethyl when $R^1$ is nitro.

2. A compound as in claim 1 said compound being 3-chloro - 4 - (2-amino-3'-chloro-4'-fluorophenyl)pyrrole.

3. A compound as in claim 1 said compound being 3-chloro-4-(2'-amino-3'-methylphenyl)pyrrole.

4. A compound as in claim 1 said compound being 3-chloro-4-(2'-amino-4'-trifluoromethylphenyl)pyrrole.

5. A compound as in claim 1 said compound being 3-chloro-4-(2'-nitro-4'-trifluoromethylphenyl)pyrrole.

References Cited

UNITED STATES PATENTS 3,428,648  2/1969  Umio et al. _____ 260—313.1
3,328,421  6/1967  Umio et al. _____ 260—326.3

OTHER REFERENCES

Nishida et al. F. of Antibiotics, Series A, vol. 18, p. 211 (1965).

Yale, F. Med. & Pharm. Chem., vol. 1, No. 2 (1959), pp. 121, 122, and 131 relied on.

ALEX MAZEL, Primary Examiner

J. A. NARCAVAGE, Assistant Examiner

U.S. Cl. X.R.

195—96; 260—326.14, 999